UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

ISOLATED ALKALI SALTS OF INDOXYL AND PROCESS OF MAKING SAME.

1,027,441. Specification of Letters Patent. Patented May 28, 1912.

No Drawing. Application filed September 26, 1910. Serial No. 583,915.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Isolated Alkali Salts of Indoxyl and Processes of Making Same, of which the following is a specification.

As known, by melting phenylglycin, its derivatives or homologues (or similar compounds yielding indoxyl derivatives, that is to say indoxyl or its substitution products, by alkaline melt), for instance with alkali hydrate or with a mixture of alkali hydrate and sodium amid, or with sodium (see British specifications Nos. 16875 of 1901 and 13059 of 1901), indoxyl melts are obtained containing a large quantity of free caustic alkali. Hitherto, these melts have been worked up by dissolving them in water and precipitating the indigo by a current of air, the alkali hydrate remaining in solution. When it was required to separate the indoxyl from the aqueous solution of its alkaline melt, it was necessary to neutralize by means of acid the excess of alkali hydrate and the alkali combined with the indoxyl. By operating in this manner all the alkali was lost. Moreover, the indoxyl was partially decomposed since it is but little stable when in a free state. However the separation of the indoxyl in some form or other is of much technical importance. It renders possible the transformation of the indoxyl into indigo in slightly alkaline or neutral or slightly acid solutions, or in solutions so much diluted that, if this dilution were used in the direct treatment of the indoxyl melts, the recovery of the alkali hydrate would no longer be profitable. This separation of the indoxyl is also of importance for the purpose of transforming the indoxyl into indigo in presence of bodies which impart to the precipitated indigo a certain physical constitution, such, for instance, as inorganic diluents which are entirely or partially soluble in alkali hydrates, or salts of fatty acids, or glue, any of which, if added to the solution of the indoxyl melt would render the recovery of the alkali hydrate difficult.

Now, according to the present invention, indoxyl can be separated in a very advantageous manner in the form of crystalline alkali salts, hitherto unknown as such, by adding to the indoxyl melt a limited quantity of water, preferably while cooling or by use of ice. After the mixture has been stirred for some time the new alkali salt of the indoxyl separates almost completely in the form of brilliant laminæ. The highly concentrated caustic alkali lye thus formed causes the precipitation of the alkali indoxyl. By filtering the mass through an asbestos or a sand filter, or subjecting it to centrifugal action, there is obtained, on the one hand, an alkali indoxyl containing only a comparatively small quantity of adhering alkali hydrate, which can be removed by suitable means, for instance by pressure or subsequent washing with a highly concentrated salt solution, and on the other hand a highly concentrated alkali lye, containing only a small quantity of indoxyl, which can be directly used again or from which the small quantity of indoxyl contained in it may be separated in the form of indigo by blowing air into it after having diluted it with water. According to the quantity of water used it is possible, either to increase the yield of crystallized indoxyl salt by using very little water and thereby separating less completely the alkali hydrate which adheres to the indoxyl salt or partially crystallizes with it, or to separate in a more perfect manner the alkali hydrate from the crystallized indoxyl salt, so that the latter is obtained in a purer and therefore still more suitable condition for further transformations, foregoing in this case a large yield of crystallized indoxyl salt. In any case the filtrate is used for the production of indigo.

The following example illustrates the invention: 100 parts by weight of indoxyl melt prepared according to Example 1 of the British specification No. 13059 of 1901, are stirred, preferably in a pulverized condition, with 100 parts of ice. A hot solution is thereby first formed, from which, on stirring and cooling, there soon separates a crystalline magma, consisting of brilliant laminæ. This magma is filtered or pressed. It still contains a small quantity of caustic alkali hydrate, which, if required, can be removed even more completely by washing with water or by diluting with a little water, or with caustic alkali lye. In this case it is advantageous to use from the beginning a little more water, or to operate first as above indicated and, after the crystallization to dilute with a little more water. According as there is used in the melt caustic soda or caustic potash, the alkali salts of indoxyl are obtained in the form of indoxyl sodium or indoxyl potassium having the formula:

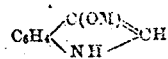

wherein "M" stands for an alkali metal. The alkali salts of indoxyl thus produced are yellowish bodies crystallized in the form of laminæ, which dissolve in alcohol to a reddish-brown solution, also in water; which can be reprecipitated from the solution in water, in the form of yellowish laminæ, by means of excess of alkali hydrate, and which separate indigo by the action of air.

Having thus described the nature of my said invention and the best means I know of carrying the same into practical effect, I claim:—

1. The process of separating alkali salts of indoxyl in a solid form from the alkaline melts of phenylglycin, compounds yielding indoxyl derivatives by alkaline melt, consisting in dissolving such a melt, preferably while cooling, in such a small quantity of water that the alkali salts of indoxyl separate in the form of crystals, and in then separating these salts from the highly-concentrated alkali lye, substantially as described.

2. As new products, the alkali salts of indoxyl in a solid form, being crystalline, yellowish laminæ, soluble in water and alcohol, in the latter to a reddish-brown solution, capable of being precipitated from the concentrated solution in water in the form of yellowish laminæ by means of an excess of alkali hydrate, and separating indigo by the action of air.

In testimony whereof, I affix my signature in presence of two witnesses.

ALBRECHT SCHMIDT.

Witnesses:
JEAN GRUND,
CARL GRUND.